United States Patent [19]

Snyder et al.

[11] 4,235,558
[45] Nov. 25, 1980

[54] BALL JOINT DESIGN

[75] Inventors: Daniel S. Snyder, Norwalk; Harold L. Kaufman, Port Clinton, both of Ohio

[73] Assignee: Gould Inc., Rolling Meadows, Ill.

[21] Appl. No.: 918,623

[22] Filed: Jun. 23, 1978

[51] Int. Cl.³ .................... F16C 11/00; F16D 11/12
[52] U.S. Cl. ................................. 403/130; 403/133; 403/137; 403/226; 403/227
[58] Field of Search .............. 403/130, 11, 140, 132, 403/135, 221, 223, 133, 134, 137

[56] References Cited

U.S. PATENT DOCUMENTS

| 3,099,879 | 8/1963 | Horovitz | 403/140 X |
| 3,342,513 | 9/1967 | Melton et al. | 403/130 X |
| 3,389,927 | 6/1968 | Herbenar | 403/140 |

FOREIGN PATENT DOCUMENTS 1263536  5/1961  France ..................... 403/133

Primary Examiner—W. L. Shedd
Attorney, Agent, or Firm—Russell E. Baumann; Edward E. Sachs

[57] ABSTRACT

A ball joint construction having a ball-stud member with a ball portion and a shank portion and an open-ended socket member into which the ball portion is inserted. An elastomeric covering is permanently bonded to both the ball member and a part of the shank portion to provide increased bond life and strength and then deformed for inserting in the open end of the socket thereby resiliently interconnecting the socket and ball members. An additional rib or lip of elastomer is provided on the covering of the ball adjacent the shank which collapses into a continuous multiple curved pattern during insertion into the socket. The rib provides for increased life of the elastomer by improved surface tension parameters and also keeps stones and other debris out of the open-ended portion of the socket. A further bonding between the socket and elastomer after insertion provides a completely bonded system capable of accepting very substantial angular movement without slippage or pullout. A lip is preferably formed by coining over the edge around the open end of the socket for further increasing the strength against stud pullout.

8 Claims, 5 Drawing Figures

BALL JOINT DESIGN

BACKGROUND OF THE INVENTION

The present invention relates to elastomer ball joints and is more particularly directed to ball and socket type joints as commonly used in steering linkage arms, power steering systems, front-end suspension systems and the like.

A great many different types of ball and socket joints have been utilized to interconnect various moving elements in vehicles. Typically, these ball and socket joints have used synthetic resins which are mechanically locked between the ball and the socket to provide a sliding surface construction. This sliding surface construction is quite susceptible to dirt, salt and other forms of contamination reducing the life of the joints. The contaminants can work their way between the resins and the ball and/or socket. Additionally, the mechanical lock and corresponding sliding surface construction is subject to ball pullout from the socket, especially in high angular loading applications. An additional problem is the stress buildup is not uniform.

An elastomer ball joint as described in U.S. Pat. No. 2,979,353, assigned to a predecessor corporation of the instant assignee, provides better reliability and protection against corrosive deterioration and ball pullout. U.S. Pat. No. 2,979,353 provides for an elastomeric ball joint in which elastomeric material is permanently chemically bonded to the ball member and then deformed and inserted into the open end of the socket member thereby resiliently interconnecting the socket and ball members. This ball joint configuration provides a joint adapted to accept most movements between the members by the molecular deformation of the rubber and to allow in the flexing properties of the elastomer substantial relative angular movement. However, even with this design slip may occur under high torsional windup. Also, contamination of the ball joint is possible by dirt, salt, etc. attacking the high-stress critical bond line between the elastomer and the ball. Additionally it is possible for stones and other debris to lodge in the open end of the socket that can damage the joints.

In view of the above noted problems with prior art elastomer ball joint design, it has been found desirable to develop a new and improved arrangement which would overcome such problems and be more reliable and acceptable for wide-spread use. The concepts of the subject invention are deemed to meet these needs and provide a new and improved ball joint arrangement which is simple in design, economical to manufacture, reliable, long lasting, protects against contaminants, prevents ball-stud pullout, and adapts readily to a wide variety of applications.

BRIEF SUMMARY OF THE INVENTION

In accordance with the present invention, there is provided an elastomeric ball joint assembly for use in motor vehicle front suspension steering linkages or the like. The assembly includes a ball-stud member with a ball portion and a shank portion and an open-ended socket member into which the ball portion of the stud is inserted. A continuous elastomeric covering is bonded to both the ball portion and a part of the shank portion to provide increased bond strength and resistance to bond line attack. Then the elastomeric material is deformed for insertion into the open end of the socket thereby resiliently interconnecting the socket and the stud. A further bonding between the socket and elastomer covering after insertion provides a completely bonded system capable of accepting very substantial angular movement without slippage or pullout.

In accordance with another aspect of the present invention, a rib or lip of elastomer is provided on the covering of the ball adjacent the shank which collapses into a continuous multiple curved pattern during insertion into the socket. The rib provides for increased life of the elastomer by improved surface tension parameters and also keeps stones and other debris from lodging in the open-ended portion of the socket.

In accordance with yet another aspect of the present invention the edge around the open end of the socket is rolled around the elastomer and ball and a lip is formed out of the edge. This lip configuration further increases the hold of the ball in the socket and prevents stud pullout.

The principal object of this invention is to provide an improved elastomeric ball joint.

Another object of this invention is to provide an elastomeric ball joint in which the deformed elastomer layer disposed between the socket and ball members is adapted to accept all relative movements between the members by the molecular deformation of the rubber.

Yet another object of the invention is to provide an elastomeric ball joint with increased bond strength and life between the elastomer and the ball.

Still a further object of the invention is to provide a highly reliable ball joint which minimizes the effects of contaminants in operation.

Other objects and advantages will become apparent hereinafter when the following specification is read in conjunction with the accompanying drawings.

DESCRIPTION OF PREFERRED EMBODIMENTS

In view of its use in this specification and in the claims that follow, it should be explained that by the word "elastomer" is meant any rubber-like polymeric material, and the words "rubber" or "rubber like" may hereinafter be used as equivalents. The term "elastomer" is a general descriptive word for rubber-like, polymeric materials and is sometimes considered as an abbreviation for elastopolymer and elastic polymer. As herein used, it may be understood to cover the high molecular elastic colloid, natural caoutchouc, synthetic rubber, synthetic natural rubber, as well as the rubber-like materials such as neoprene, butyl rubber and the styrene-butadiene copolymer.

Figure 1:
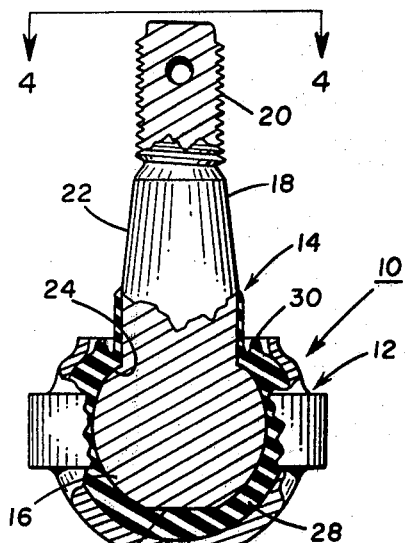
FIG. 1 is a partial longitudinal section view of a ball joint of this invention showing the socket, the ball stud, the elastomer layer and the window in the socket.
Figure 2:
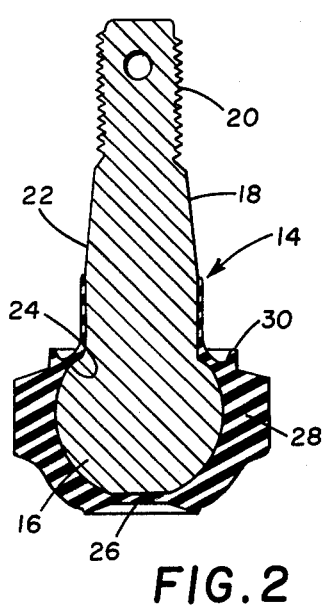
FIG. 2 is a cross-sectional view of the ball stud of this invention with the elastomer layer bonded thereto in the free state prior to assembly in the socket.
Figure 3:
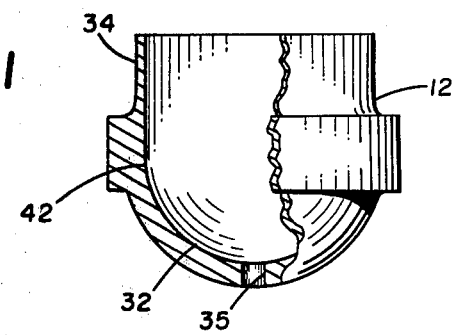
FIG. 3 is a partial section view of the socket of this invention.

In the ball stud and socket arrangement which is shown generally in FIGS. 1–4, numeral 10 designates a ball joint with an open-ended socket portion 12 and a ball-stud portion 14. Ball-stud portion 14, typically made from metal such as steel, has a general spherical ball member 16 with shank portion 18 depending therefrom. Shank portion 18 has a threaded distal end portion 20 and a tapered portion 22 which terminates at an underside portion 24 of ball member 16, as shown in FIGS. 1 and 2. The diameter of the ball member across the underside portion 24 will be larger than the largest diameter of tapered shank portion 22. The contour of the ball will ordinarily be of a circular conformation, although other spherical contours may, upon occasion, be used for special purposes. Preferably the top of the ball will have a flatter portion identified generally at 26.

Secured to portions of ball-stud 14 is an elastomer coating layer 28 which is attached to the surface by bonding or other appropriate adhesion as is known in the art. More particularly, elastomer coating layer 28 is permanently chemically bonded to ball 16 and also the top portion of tapered shank portion 22 adjacent ball portion 16. The elastomer coating is preferably one continuous bonded piece with the covering on the very top of the ball and the covering on the tapered shank portion having a thin-wall thickness. Additionally a rib or lip 30 of elastomer is provided extending up from the surface of the elastomer that covers underside portion 24 adjacent shank portion 22. More detailed description of elastomer layer and its function will be described hereinafter.

The ball stud thus described is adapted for assembly within the open-ended socket or housing 12, having a generally spherical upper wall 32 and an initially cylindrical side wall 34. Centrally disposed in the upper wall 32 is an aperture 35 for ease of precise location of ball stud in the assembly.

Referring now more particularly to the free state conformation of the elastomer coating on the ball-stud 14 prior to assembly within the socket as shown in FIG. 2, it will be noted that the elastomer coating is of varying wall thickness in different parts of the generally partially hemispherical surface. More particularly, extending circumferentially around the ball and normal to the longitudinal axis of the ball-stud member is a thicker wall portion, or flange 36. Flange 36 has a generally cylindrical outer surface which sharply decreases in wall thickness as it approaches underside portion 24 of the ball except for previously noted rib 30. The purpose of the wall thickness variations in configuration as briefly described hereinabove, and as more fully described in U.S. Pat. No. 2,979,353 incorporated herein by reference, is provided for easy assembly yielding the desired relatively uniform elastomer wall thickness.

Accordingly, as the elastomer coated ball stud is assembled within the open-ended socket, a suitable lubricant such as a light weight napthanic oil is put on the elastomer which allows the elastomer to be deformed in accordance with the complementary surface of the socket in a manner which minimizes undesirable stress concentration as more fully described in U.S. Pat. No. 2,979,353. An example of a suitable oil is Sun Oil Company's Circo-Lite® rubber processing oil. Air and excess lubricant trapped in the socket during assembly may, of course, be expelled through aperture 35 in the top of upper curved wall 32 of the socket. After inserting the covered ball stud a coining mandrel (not shown) then is used to deform the initially cylindrical wall 34 inwardly, partially closing the open end of the socket to leave only a window 38 which will, of course, obviously have a diameter less than the diameter of the ball. That is, the window and the ball stud define a clearance therebetween of sufficient magnitude to allow relative movement between the ball stud and the socket without allowing the ball to pass through the socket window. Additionally, wall 34 preferably has a lip 40 formed in it around the window for further protecting against ball stud pullout as will be more fully explained below.

Another form of this invention provides for a suitable post-bonding adhesive (not shown) to be applied to the interior portions 42 of the socket 12. The adhesive which provides for rubber-to-metal adhesion is preferably curable through heat treatment thereby providing a completely bonded system capable of accepting very substantial ball stud angular movement without slippage or pullout. A typical rubber-to-metal adhesive or elastomer bonding agent is a heat reactive elastomeric base adhesive such as Chemlok ® 234-B produced by the Hughson Chemicals, Lord Corporation, Erie, Pa. Preferably a standard metal primer is used prior to applying adhesive as is known in the art.

Figure 5:
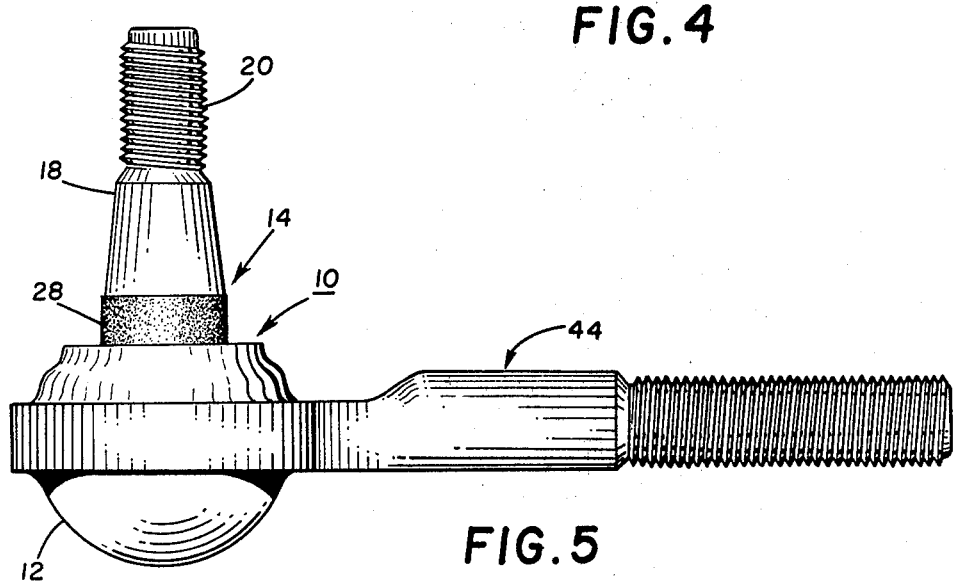
FIG. 5 is a plan view of the ball joint of this invention integrally formed with a tie rod end.

In another embodiment of this invention, as shown in FIG. 5, socket member 12 is formed as an integral part of a tie rod end 44. This provides for a highly reliable part in which welding or other forms of joining are not necessary between the tie rod member 44 and socket member 12. The preferably forged construction has gently increased strength. Additionally, much greater tolerance variances are allowable during assembly because of the uniformity of the one-piece construction.

In accordance with this invention ball joint 10 is provided with preferably a single piece coating of elastomer chemically bonded to ball-stud portion 14. This chemical bond provides a strong elastomer-to-metal adhesion between the elastomer and ball stud. The elastomer coating extends past the ball portion of the stud to cover the upper portion of the shank as shown in FIGS. 1 and 2. This extension of the elastomer down the shank provides for increased life of the ball joint because it moves the exposed elastomer-to-metal bond line away from a high-stress area. The high torsional forces are not present between the elastomer and the stud on the shank. In addition, the elastomer helps protect the shank from rust and corrosion.

Figure 4:
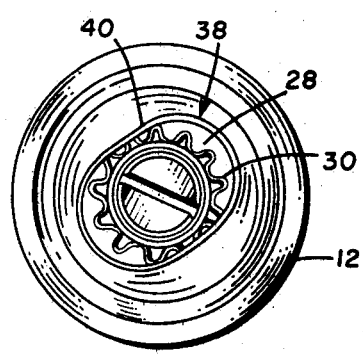
FIG. 4 is a view along line 4—4 of FIG. 1.

In accordance with this invention the elastomer coating is provided with rib 30 extending up from the surface of the elastomer that covers underside portion 24 of ball 16. This rib of extra elastomer greatly increases the life of the ball joint. The lip provides additional elastomer material at a high-stress area of torsional and angular movement and also provides for improved surface tension parameters. The lip greatly decreases elastomer failure in the high-stress window area. Additionally when inserted into socket member, the rib forms a continuous multiple curved pattern in this open window end of the socket as shown in FIG. 4. This curved pattern of material which moves as the ball joint is operational keeps stones and other debris from lodging in the open-ended window portion of the socket; and if any do lodge tends to dislodge them.

This invention has been described with reference to a preferred and alternative embodiment. Obviously modifications and alterations will occur to others upon the reading and understanding of this specification. It is our intention to include all such modifications and alterations insofar as they come within the scope of the appended claims or the equivalent thereof.

Having thus described our invention we now claim:
1. An elastomer ball joint comprising:

a ball-stud member having a ball portion at one end and a shank portion at the other end, said ball portion having an underside portion adjacent said shank portion, an open-ended socket member surrounding said ball portion in spaced relationship thereto, said open end of the socket forming a window in the socket through which said shank portion projects, the window and ball stud defining a clearance therebetween the ball stud and the socket without allowing the ball to pass through the window, and an elastomer coating layer, resiliently interconnecting the ball stud member and the socket member, said layer surrounding said ball and a portion of said shank portion adjacent said ball and, chemically bonded firmly thereto, thereby providing increased bond strength and resistance to bond line attack, and having a rib of additional elastomer in the high stress window area.

2. An elastomer ball joint as defined in claim 1 wherein said rib of additional elastomer forms a continuous multiple curved pattern after being assembled in said socket for keeping stones and other debris out of said window portion of the socket.

3. An elastomer ball joint as defined in claim 2 wherein said open-ended socket member has a side wall around said window which is formed into a lip for further protecting against ball-stud pullout.

4. An elastomer ball joint as defined in claim 3 in which said ball joint is formed as an integral part of a tie rod end.

5. An elastomer ball joint comprising:

a ball-stud member having a ball portion at one end and a shank portion at the other end, said ball portion having an underside portion adjacent said shank portion;

an open-ended socket member surrounding said ball portion in spaced relationship thereto, said open end of the socket forming a window in the socket through which said shank portion projects, the window and ball stud defining a clearance therebetween of sufficient magnitude to allow relative movement between the ball stud and the socket without allowing the ball to pass through the window; and an elastomer coating layer, resiliently interconnecting the ball-stud member and the socket member, said layer surrounding said ball and bonded firmly thereto and having a rib of additional elastomer extending from the surface of the elastomer coating layer bonded to said underside portion of the ball prior to insertion in said socket thereby providing additional elastomer in the high-stress window area.

6. An elastomer ball joint comprising:

a ball-stud member having a ball portion at one end and a shank portion at the other end, said ball portion having an underside portion adjacent said shank portion;

an open-ended socket member surrounding said ball portion in spaced relationship thereto, said open end of the socket forming a window in the socket through which said shank portion projects, the window and ball stud defining a clearance therebetween of sufficient magnitude to allow relative movement between the ball stud and the socket without allowing the ball to pass through the window; and an elastomer coating layer interconnecting the ball stud member and the socket member being chemically bonded to both the ball and the socket member, said layer having a rib of additional elastomer extending from the surface of the elastomer coating layer which is bonded to said underside portion of the ball prior to insertion in said socket thereby providing additional elastomer in the high-stress window area.

7. An elastomer ball joint as defined in claim 6 in which said elastomer coating layer surrounds said shank portion adjacent said ball.

8. An elastomer ball joint as defined in claim 7 in which said elastomer coating layer is one continuous piece.

* * * * *